United States Patent Office 3,629,248
Patented Dec. 21, 1971

3,629,248
PROCESS FOR THE PREPARATION OF
OXAZINE DYESTUFFS
Gustav Schäfer, Frankfurt am Main, and Adam Trombetta, Niederjosbach, Taunus, Germany, assignors to Farbwerke Hoechst Aktiengesellschaft vormals, Meister Lucius & Brüning, Frankfurt am Main, Germany
No Drawing. Continuation-in-part of application Ser. No. 655,756, July 25, 1967. This application July 24, 1969, Ser. No. 844,664
Claims priority, application Germany, Aug. 4, 1966, F 49,871
Int. Cl. C07d 87/50
U.S. Cl. 260—242                          2 Claims

ABSTRACT OF THE DISCLOSURE

A process for the manufacture of crystalline, pure and brilliant basic oxazine dyestuffs of the general formula

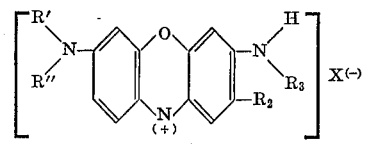

in which R′ and R″ represent lower alkyl groups, $R_2$ represents a hydrogen atom or a methyl group, $R_3$ stands for a hydrogen atom or a lower alkyl group or the phenyl group which may be substituted by methyl, methoxy or ethoxy groups, and $X^{(-)}$ represents the anion $ZnCl_3^-$ or $ZnBrCl_2^-$, said dyestuffs yielding on tanned cotton and on polyacrylonitrile fibres brilliant blue dyeings, showing good to very good fastness to light and an excellent fastness to wet processing on polyacrylonitrile fibres.

This application is a continuation in part application of our copending application Ser. No. 655,756 filed July 25, 1967, now abandoned.

The German patent specification No. 62,367 describes a process for the preparation of basic oxazine dyestuffs, by which dimethyl-m-amidocresol with quinodichloro imide or nitroso-dimethyl aniline sels or with nitrosodiethyl aniline sels were condensed in an appropriate solvent, while hot.

Moreover, the German patent specification No. 300,253 represents a process for the manufacture of basic oxazine dyestuffs, by which m-aminophenols or the mono- or dialky compounds thereof were condensed with the nitroso compounds of the mono- or dialkyl-m-amino-phenol ethers or by which the p-diamino compounds of phenol ethers or the alkyl compounds thereof, in which the amino group in ortho position to the alkoxy group is not substituted, were oxidized together with m-amino-phenols or the derivatives thereof. Compared with the process of the German patent specification No. 62,367 mentioned this process has the advantage of producing dyestuffs of a high purity and at a good yield. Thus, according to Example 1 of said German patent specification No. 300,253, a brilliant greenish blue dyestuff is obtained (C.I. 1956, 2nd edition, No. 51005).

When carrying out the process according to Example 1 of said German patent specification No. 300,253 in that way that the nitroso compound of the diethyl-m-aminophenol ether is condensed with a N-unsubstituted or N-monoalkyl substituted m-aminophenol instead of diethyl-m-aminophenol, it is true, a high yield is obtained as to the resulting crude product, but the product obtained is much more difficult to dissolve in water than its theoretical structure implies. Moreover, the product yields, for example, on polyacrylonitrile fibres unsightly grey blue dyeings of a tinctorial strength of about only 10% compared with that obtained with the dyestuff according to Example 1. Thus the statement given on page 1, left column, lines 17 to 21 of said patent specification, i.e. the dyestuffs obtained according to the process precipitate directly in a completely pure form and render thus unnecessary a high-loss purification, does not come true for the reaction of the N-unsubstituted and N-monoalkylated m-aminophenols. This evidence makes the process useless for a technical use with regard to the condensation of the nitroso compounds of m-dialkylaminophenol ethers with N-unsubstituted or N-monoalkyl substituted m-aminophenols.

Now it has been found that crystalline pure and brilliant basic oxazine dyestuffs of the general Formula 1

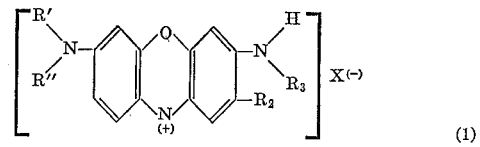

wherein R′ and R″ each represents lower alkyl, such for example as methyl or ethyl, $R_2$ represents hydrogen atom or methyl, $R_3$ represents hydrogen atom or lower alkyl or phenyl, which may be substituted by 1 to 3 methyl groups or by methoxy or ethoxy groups, and $X^{(-)}$ represents the anion $ZnCl_3^-$ or $ZnBrCl_2^-$, can be prepared by condensing 1 mol of the hydrochloride or hydrobromide of an N-dialkyl-m-phenetidine of the general formula 2

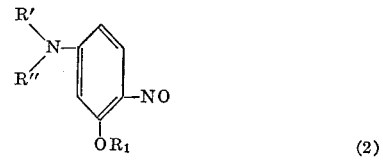

wherein R′ and R″ are defined as above, and $R_1$ represents lower alkyl, with about 1 mol of an m-aminophenol of the general Formula 3

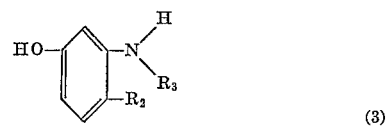

in which $R_2$ and $R_3$ are defined as above, in the presence of finely dispersed zinc, copper, cadmium or magnesium in an amount of from about 1.5 to about 8% by weight, preferably from about 3 to 6% by weight, referred to the N-dialkyl-m-phenetidine of Formula 2, in a lower alkanol medium, preferably in methanol or ethanol, the ratio in parts by weight between the m-aminophenol of Formula 3 and the said lower alkanol being in the range of about 1:10 to about 1:25, preferably 1:15 to 1:25, and isolating the dyestuff formed as zinc chloride double salt in crystalline form by the addition of a concentrated aqueous zinc chloride solution or of solid zinc chloride. The termination of the condensation is indicated with the using up of the nitroso compound. When this stage has occurred the isolation of the dyestuff in form of the zinc chloride double salt is carried out by the addition of zinc chloride. Before salting out the dyestuff it is suitable to distil a larger amount of the lower alkanol used as solvent.

In general, the process may be carried out at a lower alkanol dilution of 1:25, referred to the m-aminophenol introduced. When applying such high dilutions, however, relatively great amounts of lower alcanol have to be distilled off before the dyestuff is isolated. When using the lower alkanol in a dilution of 1:10 the yield is reduced by an increased number of undesired side reactions.

Condensation suitably takes place at a temperature in the range of from about 40° C. to 120° C., preferably from about 60° C. to 90° C.

The oxazine dyestuffs obtained according to the process of the present invention precipitate at a good yield and in pure form, thus saving a cumbersome and expensive purification. On tanned cotton and on polyacrylonitrile fibres they yield brilliant blue dyeings, showing good to very good fastness to light and an excellent fastness to wet processing on polyacrylonitrile fibres. Dyeings on tanned cotton prove to have good fastness to wet processing.

The following examples serve to illustrate the invention but they are not intended to limit it thereto.

EXAMPLE 1

A mixture of 125 g. of N-diethyl-m-phenetidine, 300 g. of water, 170 g. of hydrochloric acid (30% strength) and 80 g. of sodium chloride was cooled to 0° C. and then 114 g. of a 40% aqueous sodium nitrite solution were added at the same temperature. The p-nitroso compound formed was isolated in form of the hydrochloride by filtering off and, in the course of several hours, while moist introduced into a boiling mixture of 100 g. of 4-hydroxy-2-ethylaminotoluene in 1,500 g. of ethanol and 4 g. of powdered copper. The solution obtained was then heated at reflux for 1 hour. 1,200 g. of the ethanol were distilled off, the solution was cooled to 20° C. and mixed with a solution of 190 g. of zinc chloride in 190 g. of water. The formed dyestuff precipitated in the course of several hours in form of crystals. It was isolated by filtering, washed and dried. 220 g. of the dyestuff of the formula

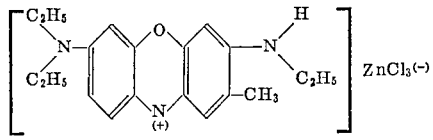

were obtained, corresponding to a yield of 64% of theory, referred to the 4-hydroxy-2-ethylaminotoluene introduced.

On tanned cotton and on polyacrylonitrile fibres the dyestuff yielded brilliant blue dyeings of good or very good fastness to wet processing.

When using instead of powdered copper the same amount of pulverized magnesium, the same results were obtained.

EXAMPLE 2

A mixture of 125 g. of N-diethyl-m-phenetidine, 320 g. of ethanol and 170 g. of hydrochloric acid (30% strength) was cooled to 0° C. and 114 g. of a 40% aqueous sodium nitrite solution were added at the same temperature and the p-nitroso compound formed crystallized partly in this medium in form of the hydrochloride. After having adjusted the pH to 4–4.5 by addition of sodium carbonate the suspension obtained was given in small portions into the boiling mixture of 75 g. of 1-methyl-4-hydroxy-2-aminobenzene and 5 g. of zinc dust in 1,300 g. of ethanol. The reaction terminated, 1,300 g. of ethanol were distilled off and the dyestuff was salted out by addition of 80 g. of a 50% aqueous zinc chloride solution. The dyestuff formed, corresponding to the formula

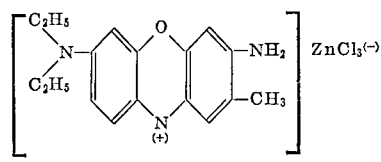

was isolated by filtering with suction, by washing and drying.

240 g. of the dyestuff were obtained, corresponding to a yield of 70% of theory, referred to the 1-methyl-4-hydroxy-2-aminobenzene introduced. On tanned cotton and on polyacrylonitrile fibres the dyestuff yields brilliant reddish blue dyeings of good or very good fastness to wet processing.

When using instead of zinc dust the same amount of finely pulverized cadmium and when proceeding in the way described above, the same results were obtained.

When replacing the 1-methyl-4-hydroxy-2-aminobenzene by the equivalent amount of m-hydroxydiphenyl amine and when proceeding as described above, a greenish blue dyestuff was obtained, yielding on polyacrylonitrile fibres dyeings of very good fastness to light.

We claim:
1. A process for the manufacture of a basic oxazine dyestuff of the Formula 1

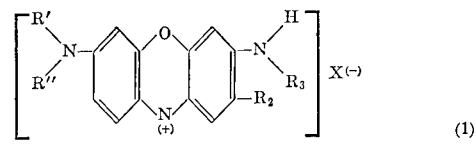

in which R' and R" each represents lower alkyl, $R_2$ represents hydrogen or methyl, $R_3$ represents hydrogen, lower alkyl, phenyl, methylphenyl, methoxyphenyl or ethoxyphenyl, and $X^-$ represents the anion $ZnCl_3^-$ or $ZnBrCl_2^-$, wherein 1 mol of the hydrochloride or hydrobromide of an N-dialkyl-m-phenetidine of the Formula 2

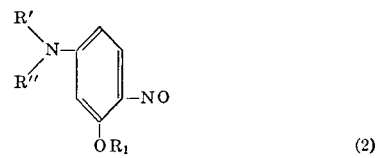

in which R' and R" are defined as above, and $R_1$ represents lower alkyl, is condensed with 1 mol of an m-aminophenol of the Formula 3

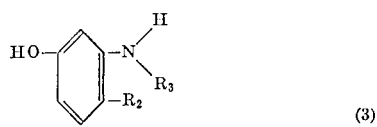

in which $R_2$ and $R_3$ are defined as above, in the presence of finely dispersed zinc, copper, cadmium or magnesium in an amount of from about 1.5 to about 8% by weight, referred to the N-dialkyl-m-phenetidine of Formula 2, in a lower alkanol medium, the ratio in parts by weight between the m-aminophenol of Formula 3 and said lower alkanol being in the range of about 1:10 to about 1:25, at a temperature between about 40° C and about 120° C. and the dyestuff formed is isolated as zinc chloride double salt in crystalline form by the addition of an aqueous zinc chloride solution or of solid zinc chloride.

2. A process according to claim 1 wherein said zinc, copper, cadmium or magnesium is used in an amount of from about 3% to about 6%.

References Cited

UNITED STATES PATENTS

| 2,528,862 | 11/1950 | Crossley et al. | 260—244 |
| 2,528,863 | 11/1950 | Crossley et al. | 260—244 |

FOREIGN PATENTS

| 300,253 | 9/1917 | Germany | 260—244 |
| 705,310 | 3/1954 | Great Britain | 260—244 |

NATALIE TROUSOF, Primary Examiner

U.S. Cl. X.R.

8—54.2, 55; 260—37 N, 37 P, 244 R, 574, 575, 577